United States Patent
Kume et al.

(10) Patent No.: US 6,760,284 B2
(45) Date of Patent: Jul. 6, 2004

(54) DISK CHANGER TYPE DISK PLAYER

(75) Inventors: Hideki Kume, Osaka (JP); Takayuki Murakami, Osaka (JP); Tetsuya Tamura, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 113 days.

(21) Appl. No.: 10/232,600

(22) Filed: Sep. 3, 2002

(65) Prior Publication Data

US 2003/0043703 A1 Mar. 6, 2003

(30) Foreign Application Priority Data

Sep. 4, 2001 (JP) .................................... P2001-267900

(51) Int. Cl.[7] ............................ G11B 21/08; G11B 7/85
(52) U.S. Cl. .................................................. 369/30.93
(58) Field of Search .......................... 369/30.79, 30.5, 369/30.9, 30.91, 30.92, 30.93, 30.94, 30.95, 30.96, 30.97, 30.98, 30.99; 360/98.04, 98.06

(56) References Cited

U.S. PATENT DOCUMENTS

| | | | | |
|---|---|---|---|---|
| 5,386,403 A | * | 1/1995 | Morioka et al. | 369/30.98 |
| 5,719,725 A | * | 2/1998 | Nakao | 360/98.06 |
| 5,872,752 A | * | 2/1999 | Inatani | 369/30.79 |
| 5,953,293 A | * | 9/1999 | Kajiyama et al. | 369/30.86 |

FOREIGN PATENT DOCUMENTS

JP        4-58842        5/1992

* cited by examiner

Primary Examiner—George J. Letscher
Assistant Examiner—C R Magee
(74) Attorney, Agent, or Firm—Morgan, Lewis & Bockius LLP

(57) ABSTRACT

A rotary tray having a plurality of disk mounting sections is pivotally supported by a central shaft arranged on a tray support face of a casing, a rim protruding from a lower face of the rotary tray is movably set on a sliding face block arranged in an outer circumferential section of the tray support face, and disk mounted on a desired disk mounting section is opposed to an optical pickup when the rotary tray is intermittently rotated by a predetermined angle, and the sliding face block is engaged in a space formed between a recess step circumferential face, which is formed along an inner edge of an outer circumferential section of the tray support face, and a support frame integrally formed in the outer circumferential section and being opposed to the recess step circumferential face.

6 Claims, 5 Drawing Sheets

DISK CHANGER TYPE DISK PLAYER

BACKGROUND OF THE INVENTION

1. Field of the Invention

The present invention relates to a disk changer type disk player such as DVD (Digital Versatile Disc) changer set which is compact and capable of rotating smoothly and quietly.

2. Description of the Related Art

An example of a disk changer type disk player is disclosed in Japanese Unexamined Utility Model Publication No. 4-58842. The conventional disk changer type disk player is explained as follows referring to FIGS. 7 and 8. There is provided a rotary tray 1 having a plurality of disk mounting sections 1a. This rotary tray 1 is pivotally supported by a central shaft 4 arranged on a tray support face 3 of a casing 2. A rim 1b protruding from a lower face of the rotary tray 1 is movably set on a plurality of guide rollers 5 that are arranged in the outer circumferential section 3a of the tray support face 3 at the angular interval of 120°.

As shown in FIG. 8, each guide roller 5 is inserted into a recess 6 formed in the outer circumferential section 3a of the tray support face 3. The support shafts 5a protruding from both end faces of the guide roller 5 are respectively pivotally inserted into a shaft hole 7 and a long groove 8 formed on an inner face of the recess 6. An outer circumferential face of the guide roller 5 is covered with a rubber layer, the frictional coefficient of which is high. When the rotary tray 1 is rotated in the direction of arrow "a", each guide roller 5 is rotated via the rim 1b, so that the rotary tray 1 can be smoothly rotated.

As shown in FIG. 8, there is provided a drive mechanism 11 including: an swing arm 11a, one end of which is pivotally supported by a support shaft 9, the other end of which is provided with a cam follower 10; and a rotary cam 11b, a cam groove 12 on the outer circumferential face of which is engaged with the cam follower 10. A spindle motor 13 is fixed to the swing arm 11a, and a turn table 14 is attached to a drive shaft 13a of the spindle motor 13. An optical pickup 15 is movably arranged on the swing arm 11a. A chuck arm 17 supports a damper 16 being opposed to the turn table 14 so that the damper 16 can be moved upward and downward in a predetermined range. A forward end of the chuck arm 17 is connected with a central portion of the casing 2 via the central shaft 4, and a rear end of the chuck arm 17 is connected with a side wall of the casing 2.

As shown in FIG. 8, in the above structure, when the rotary cam 11b is rotated so that the swing arm 11a is moved upward via the cam groove 12 and the cam follower 10, disk D is chucked by the turn table 14 and the damper 16, and moved to the rotary tray 1 side. When the spindle motor 13 is driven, the turn table 14 is rotated, and the optical pickup 15 is moved in the radial direction of disk D. Due to the foregoing, information recorded on disk D can be read out and played back by the optical pickup 15.

In the above structure, the diameter of the guide roller 5 for supporting the rotary tray 1 is, for example, about 8 mm. That is, the diameter of the guide roller 5 is relatively large so that the guide roller 5 is voluminous. Therefore, it is difficult to make the casing 2 compact, and further the position at which the guide roller 5 is arranged is restricted and the number of the guide rollers 5 is also restricted. (In this example, three guide rollers are provided.) As a result, the rotary tray 1 tends to be supported unstably.

In some cases, the rotary tray 1 is deformed by residual strain generated in the process of forming, and errors tend to be caused in levelness of the lower edge of the rim 1b. Due to the foregoing, contact pressure of the rim 1b with each guide roller 5 can not be kept uniform, so that it becomes difficult to rotate the rotary tray 1 at a constant speed. Accordingly, there is a possibility that the optical pickup 15 can not correctly read out information from the disk.

Further, when the guide roller 5 is rotated, irregular slippage is caused at the contact point of the guide roller 5 with the rim 1b and also at the contact point of the support shaft 5a of the guide roller 5 with the shaft hole 7 and also at the contact point of the guide roller 5 with the long groove 8, that is, irregular slippage is caused at the three contact points. When slippage is caused as described above, a relatively high intensity of noise is generated, which makes a user uncomfortable.

SUMMARY OF THE INVENTION

It is an object of the present invention to provide a disk changer type disk player which is compact and capable of rotating smoothly and quietly.

In order to accomplish the above object, the present invention according to a first aspect provides a disk changer type disk player including: a casing having a tray support face; a recess step circumferential face formed along an inner edge of an outer circumferential section of the tray support face; a plurality of support frames arranged in the outer circumferential section at regular intervals in the circumferential direction, each support frame having a substantially C-shaped frame body integrally formed in the outer circumferential section and being opposed to the recess step circumferential face and a pair of substantially L-shaped engaging pieces integrally protruding from both ends of the frame body; a central shaft disposed on the tray support face; a rotary tray having a plurality of disk mounting sections, the rotary tray being rotatably supported by the central shaft; a rim protruding from a lower face of the rotary tray; a plurality of sliding face blocks, each sliding face block is engaged in a space formed between the recess step circumferential face and the support frame; and an optical pickup, wherein a disk mounted on the disk mounting section is opposed to the optical pickup when the rotary tray is intermittently rotated by a predetermined angle, wherein the sliding face blocks are made of fluororesin, the frictional coefficient of which is low, and wherein the rim is in slidably contact with the sliding face blocks.

According to the above structure, each sliding face block is supported by the C-shaped frame body of the support frame and the recess step circumferential face so that the sliding face block can not be moved in the horizontal direction, and at the same time each sliding face block is supported by a pair of L-shaped engaging pieces integrally protruded from both end portions of the frame body so that the each sliding face block can not rise up. Therefore, each sliding face block can be positively fixed at a predetermined position on the outer circumferential section on the tray support face.

Height of the sliding face block to support the rotary tray is very small, that is, the sliding face block is not voluminous. Therefore, the sliding face block can not be a cause to hinder the reduction in the size of the casing. Therefore, it is possible to arbitrarily determine the positions at which the sliding face blocks are arranged and it is also possible to arbitrarily determine the number of the sliding face blocks, so that the rotary tray can be stably supported.

Further, even when the rotary tray is deformed by residual strain generated in the process of forming and errors are caused in the levelness of the lower edge of the rim, since the weight of the rotary tray is supported by a large number of sliding face blocks, it is possible to keep the contact pressure of each sliding face block with the rim to be substantially constant so that the rotary tray can be stably rotated. Due to the foregoing, the optical pickup can accurately readout information from the disk.

Further, when the rotary tray is rotated, slippage is caused only at one contact point of the rim with the sliding face block. Furthermore, the sliding face block is made of material, the slipping sound of which is very small. Therefore, compared with the conventional rotary tray, an intensity of the sound is very low, and the rotary tray supported by each sliding face block can be stably, quietly rotated over a long period of time.

The present invention according to a second aspect provides a disk changer type disk player including: a casing having a tray support face; a central shaft disposed on the tray support face; a rotary tray having a plurality of disk mounting sections, the rotary tray being rotatably supported by the central shaft; a rim protruding from a lower face of the rotary tray; a plurality of sliding face blocks arranged in an outer circumferential section of the tray support face at regular intervals in the circumferential direction; and an optical pickup, wherein the sliding face blocks are made of fluororesin, the frictional coefficient of which is low, and wherein the rim is in slidably contact with the sliding face blocks.

According to the above structure, height of the sliding face block to support the rotary tray is very small, that is, the sliding face block is not voluminous. Therefore, the sliding face block can not be a cause to hinder the reduction in the size of the casing. Therefore, it is possible to arbitrarily determine the positions at which the sliding face blocks are arranged and it is also possible to arbitrarily determine the number of the sliding face blocks, so that the rotary tray can be stably supported.

Further, even when the rotary tray is deformed by residual strain generated in the process of forming and errors are caused in the levelness of the lower edge of the rim, since the weight of the rotary tray is supported by a large number of sliding face blocks, it is possible to keep the contact pressure of each sliding face block with the rim to be substantially constant so that the rotary tray can be stably rotated. Due to the foregoing, the optical pickup can accurately read out information from a disk.

Further, when the rotary tray is rotated, slippage is caused only at one contact point of the rim with the sliding face block. Furthermore, the sliding face block is made of material, the slipping sound of which is very small. Therefore, compared with the conventional rotary tray, an intensity of the sound is very low.

According to a third aspect of the invention, each sliding face block is engaged in a space formed between a recess step circumferential face, which is formed along an inner edge of an outer circumferential section of the tray support face, and a support frame integrally formed in the outer circumferential section and being opposed to the recess step circumferential face.

According to the above structure, only when each sliding face block is engaged in a space formed between the recess step circumferential face on the tray support face and the support frame opposed to it, the sliding face block can be fixed at a predetermined position.

According to a fourth aspect of the invention, the support frame includes a substantially C-shaped frame body, which is integrally formed in the outer circumferential section of the tray support face, and also includes a pair of substantially L-shaped engaging pieces integrally protruding from both end portions of the frame body, and each sliding face block is engaged in a space formed among the frame body, both the engaging pieces and the recess step section circumferential face.

According to the above structure, each sliding face block is supported by the C-shaped frame body of the support frame and the recess step circumferential face so that the sliding face block can not be moved in the horizontal direction, and at the same time each sliding face block is supported by a pair of L-shaped engaging pieces integrally protruded from both end portions of the frame body so that the each sliding face block can not rise up. Therefore, each sliding face block can be positively fixed at a predetermined position on the outer circumferential face on the tray support face.

According to the fifth aspect of the invention, each sliding face block is made of fluororesin.

According to the above structure, each sliding face block is made of fluororesin, the frictional coefficient of which is low. Therefore, the rotary tray supported by each sliding face block can be stably, quietly rotated over a long period of time.

DETAILED DESCRIPTION OF THE PREFFERED EMBODIMENTS

Figure 1:
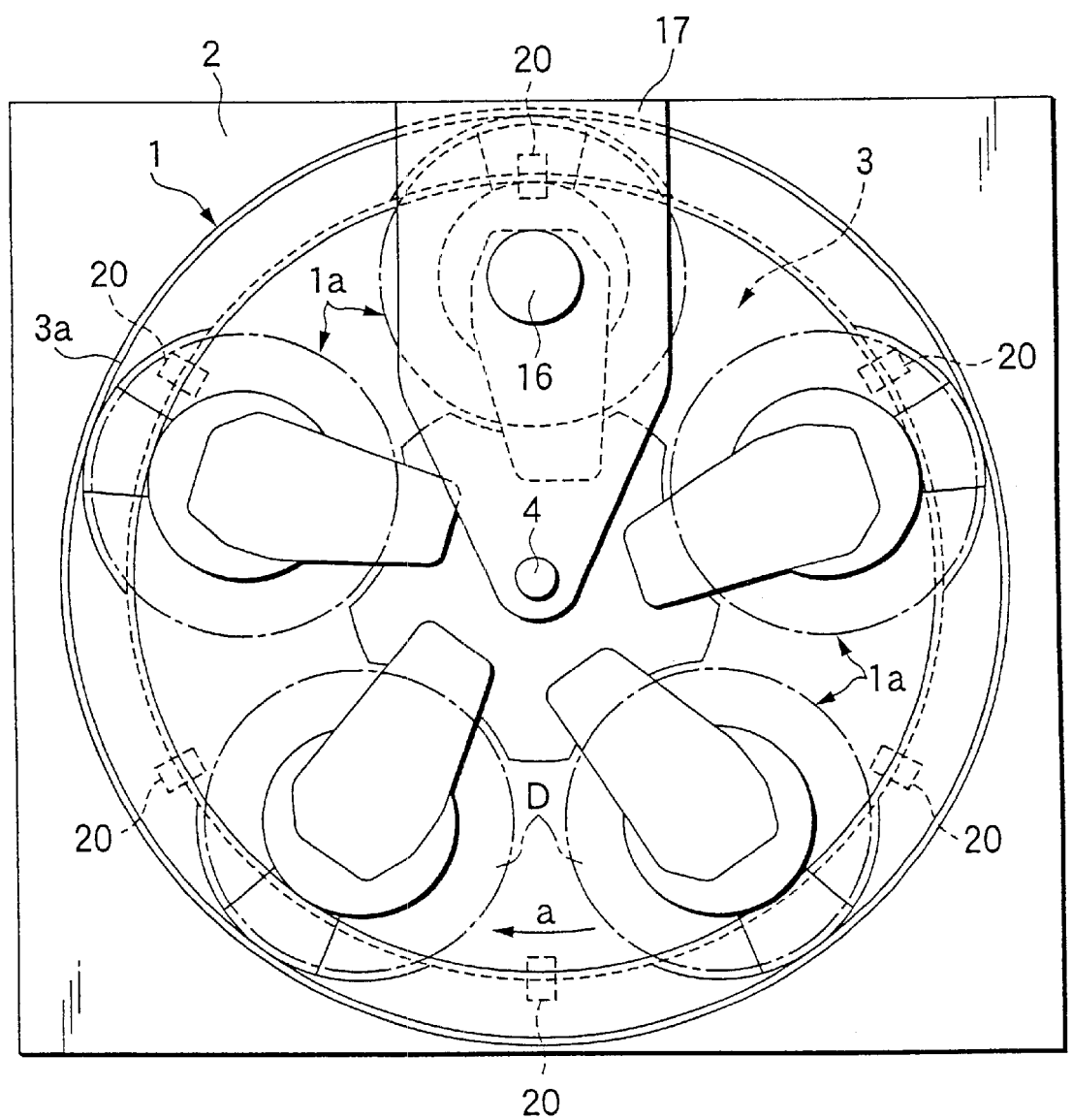
FIG. 1 is a plan view showing a disk changer type disk player of an embodiment of the present invention.
Figure 2:
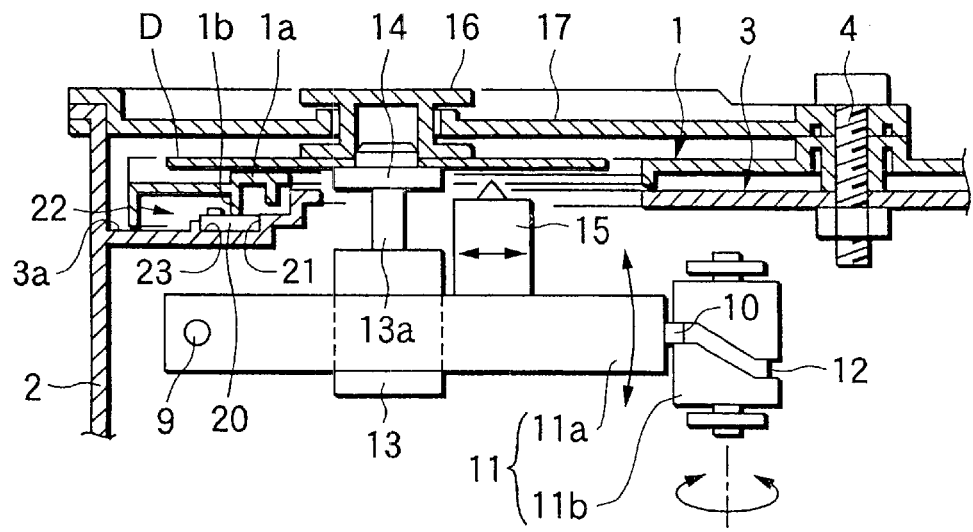
FIG. 2 is a sectional view showing an outline of the disk changer type disk player.
Figure 7:
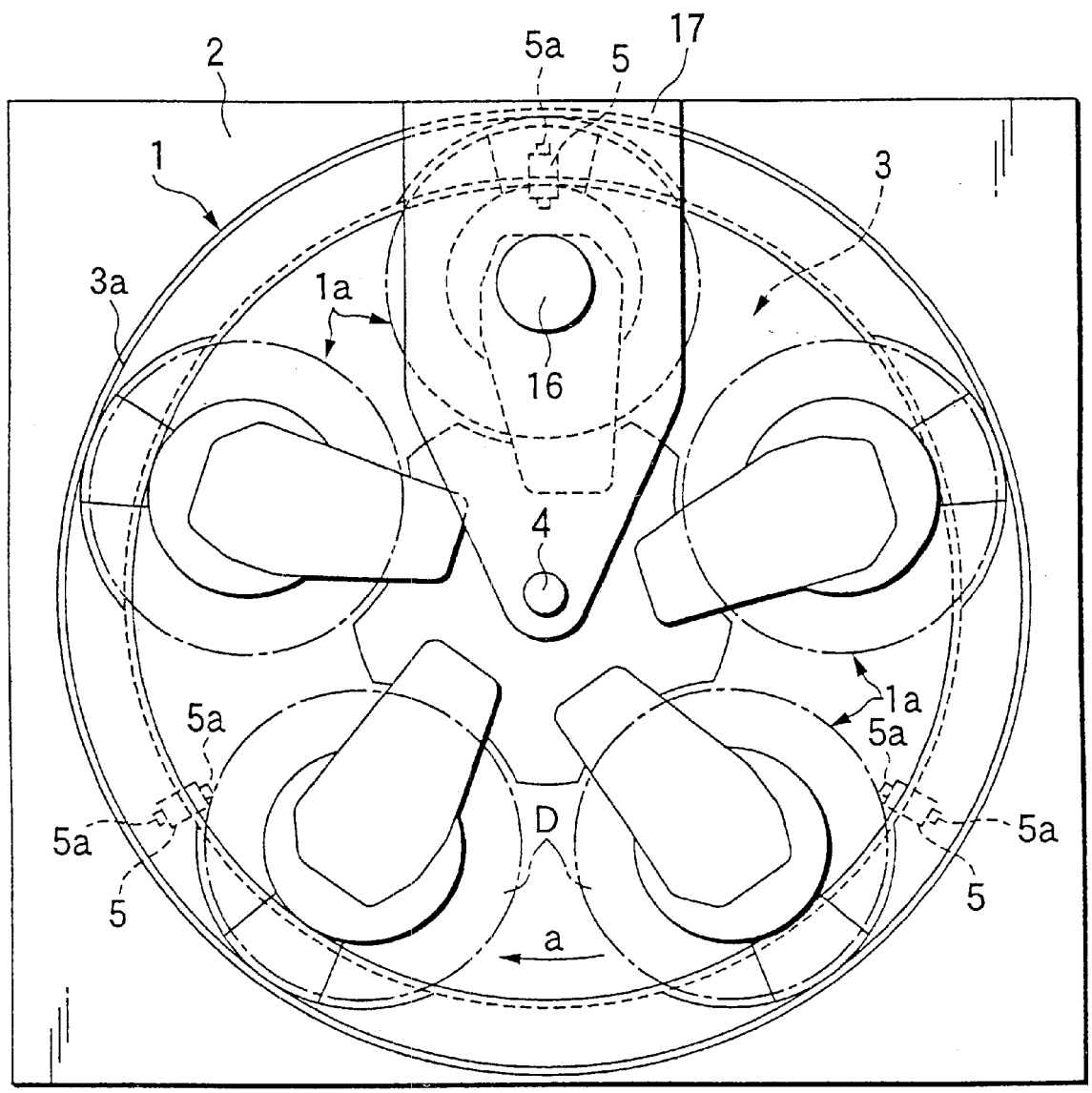
FIG. 7 is a plan view showing a conventional example.
Figure 8:
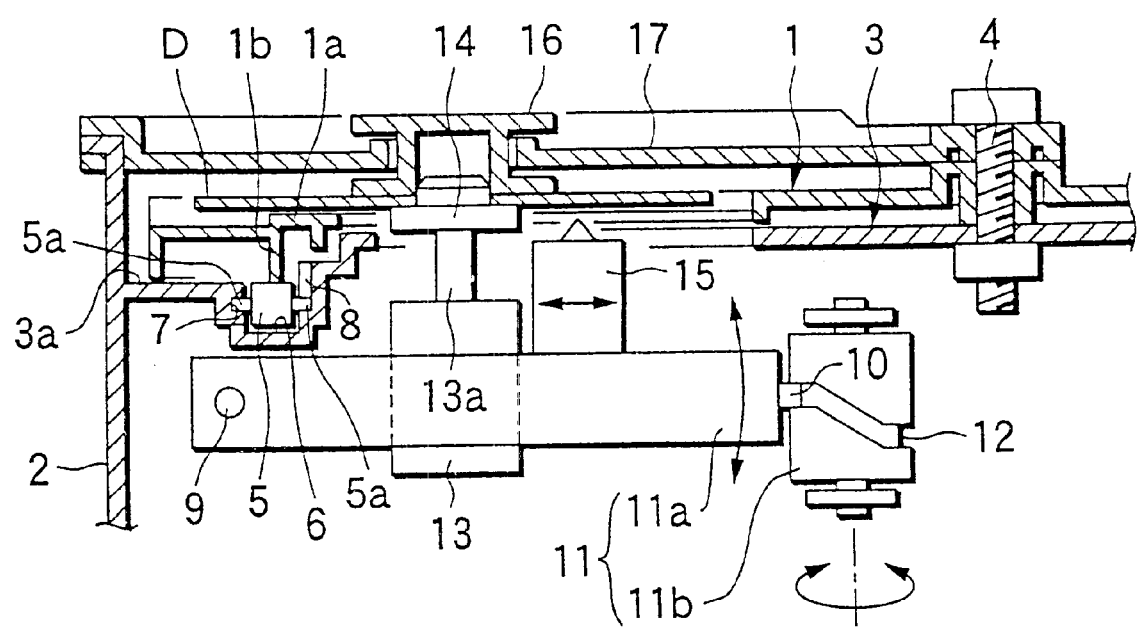
FIG. 8 is a sectional view showing an outline of the conventional example.

FIGS. 1 and 2 are views showing a disk changer type disk player that is an embodiment of the present invention. A rotary tray 1 is supported by a plurality of sliding face blocks 20, and each sliding face block 20 is engaged in a space 23 formed between a recess step circumferential face 21, which is formed along an inner edge of the outer circumferential section 3a of the tray support face 3 made of synthetic resin, and a support frame 22 which is integrally formed in the outer circumferential section 3a of the tray support face 3 being opposed to the recess step circumferential face 21. The tray support face 3 and the support frame 22 are formed from styrene, ABS (Acrylonitrile-Butadiene-Styrene resin), or the like. Other points of the structure of the disk player are substantially the same as those of the structure shown in FIGS. 7 and 8. Therefore, like reference characters are used to indicate like parts in various views of FIGS. 1, 2, 7 and 8, and the explanations are omitted here.

Figure 3:
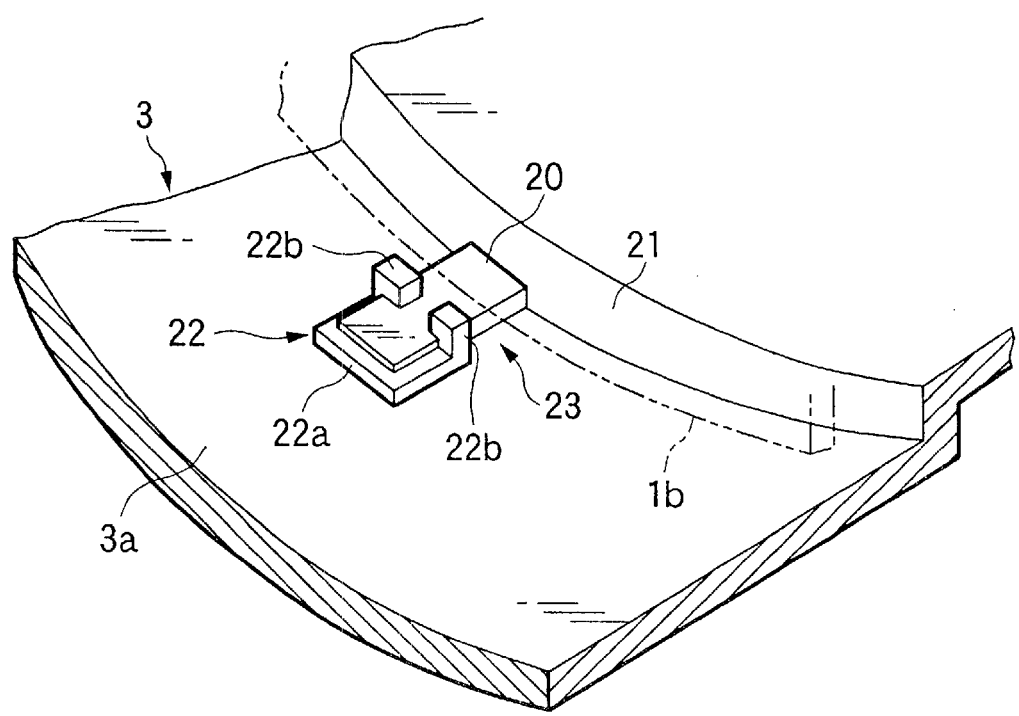
FIG. 3 is a perspective view showing a primary portion of the disk changer type disk player.
Figure 4:
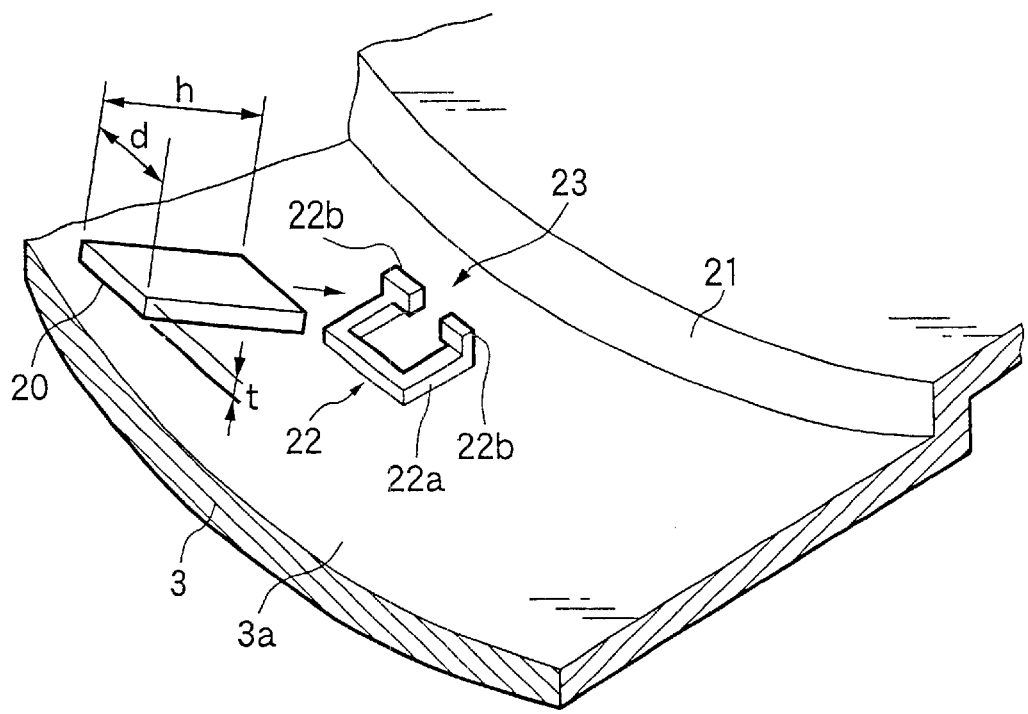
FIG. 4 is an exploded perspective view showing a primary portion of the disk changer type disk player.

The sliding face block 20 is made of fluororesin, the frictional coefficient of which is low, such as polytetrafluoroethylene, polyvinylidene fluoride, or the like. As shown in FIGS. 3 and 4, the sliding face block 20 is formed into a rectangular block, the height "t" of which is 0.8 mm, the width "d" of which is 5 mm, and the length "h" of which is 15 mm. A plurality of sliding face blocks 20 (six sliding face blocks 20 in this embodiment) are arranged in the outer circumferential section 3a of the tray support face 3 at the interval of a predetermined angle (60° in this embodiment) as shown in FIG. 1. These sliding face blocks 20 preferably have the height "t" of not less than 0.1 mm and not more than 2 mm.

According to the above structure, the height of the sliding face block 20 to support the rotary tray 1 is small, that is, the sliding face block 20 is not voluminous. Therefore, the sliding face block 20 can not be a cause to hinder the reduction in the size of the casing 2. Therefore, it is possible to arbitrarily determine the positions at which the sliding face blocks 20 are arranged, and it is also possible to arbitrarily determine the number of the sliding face blocks 20, so that the rotary tray 1 can be stably supported.

Figure 5:
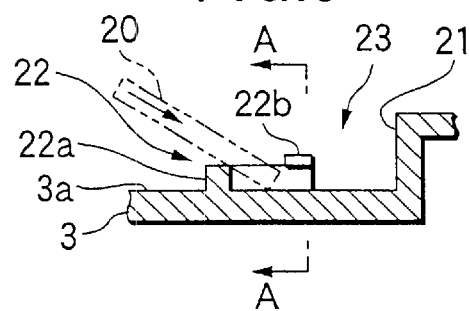
FIG. 5 is a sectional view showing a primary portion of the disk changer type disk player.
Figure 6:
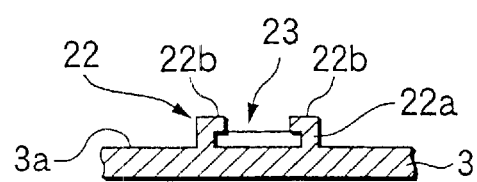
FIG. 6 is a sectional view taken along the line A-A in FIG. 5.

As shown in FIGS. 4 to 6, the support frame 22 includes a substantially C-shaped frame body 22a, which is integrally formed in an outer circumferential section 3a of the tray support face 3, and also includes a pair of substantially L-shaped engaging pieces 22b, which integrally protrudes from the both ends of the frame body 22a. The forward end portions of the engaging pieces are bent in right angle so as to face with each other. As shown by the chain double-dashed line in FIG. 5, when one end of the sliding face block 20 is inserted and pushed into between the frame body 22a and both engaging pieces 22b from an obliquely upper portion of the support frame 22, the sliding face block 20 can be engaged in the space 23 formed among the frame body 22a, both the engaging pieces 22b and the recess step circumferential face 21.

According to the above structure, each sliding face block 20 is supported by the C-shaped frame body 22a and the recess step circumferential face 21 so that the sliding face block 20 can not be moved in the horizontal direction, and at the same time each sliding face block 20 is supported by a pair of substantially L-shaped engaging pieces 22b integrally protruded from both end portions of the frame body 22a so that the each sliding face block 20 can not rise up. Therefore, each sliding face block 20 can be positively fixed at a predetermined position on the outer circumferential face 3a on the tray support face 3.

Each sliding face block 20 can be detached from the support frame 22 by lifting its one end and bringing the sliding face block 20 into an oblique posture. Therefore, maintenance of the sliding face block 20 is easy. When slidability of an upper face of the sliding face block 20 is decreased by its abrasion, the sliding face block 20 can be detached from the support frame 22, inverted upside down and attached to the support frame 22 again. In this way, most parts of the surface of the sliding block can be used effectively.

As shown in FIG. 2, when the rotary tray 1 mounted on each sliding face block 20 is intermittently rotated by a predetermined angle, disk D mounted in the desired disk mounting section 1a is opposed to the optical pickup 15. When the rotary cam 11b is rotated so that the swing arm 11a is moved upward via the cam groove 12 and the cam follower 10, disk D is caught by the turn table 14, which has been moved to the rotary tray side, and the clamper 16.

When the spindle motor 13 is driven, the turn table 14 is rotated, and the optical pickup 15 is moved in the radial direction of disk D. Due to the foregoing, information recorded on disk D can be read out and played back by the optical pickup 15.

Even when the rotary tray 1 is deformed by residual strain generated in the process of forming and errors are caused in the levelness of the lower edge of the rim 1b, since the weight of the rotary tray 1 is supported by a plurality of sliding face blocks 20 and the weight of the rotary tray 1 is distributed to them, it is possible to keep the contact pressure of each sliding face block 20 with the rim 1b to be substantially constant so that the rotary tray 1 can be stably rotated. Due to the foregoing, the optical pickup 15 can accurately read out information from the disk.

The rim 1b has a lower edge whose section is substantially a hemispherical shape.

Further, when the rotary tray 1 is rotated, slippage is caused only at one contact point of the rim 1b with the sliding face block 20. Furthermore, the sliding face block 20 is made of material, the slipping sound of which is very small. Therefore, compared with the conventional rotary tray, an intensity of the sound is very low, and the rotary tray 1 supported by each sliding face block 20 can be stably, quietly rotated over a long period of time.

According to the first aspect of the invention, each sliding face block is supported by the C-shaped frame body of the support frame and the recess step circumferential face so that the sliding face block can not be moved in the horizontal direction, and at the same time each sliding face block is supported by a pair of L-shaped engaging pieces integrally protruded from both end portions of the frame body so that the each sliding face block can not rise up. Therefore, each sliding face block can be positively fixed at a predetermined position on the outer circumferential section on the tray support face.

Height of the sliding face block to support the rotary tray is very small, that is, the sliding face block is not voluminous. Therefore, the sliding face block can not be a cause to hinder the reduction in the size of the casing. Therefore, it is possible to arbitrarily determine the positions at which the sliding face blocks are arranged, and it is also possible to arbitrarily determine the number of the sliding face blocks, so that the rotary tray can be stably supported.

Further, even when the rotary tray is deformed by residual strain generated in the process of forming and errors are caused in the levelness of the lower edge of the rim, since the weight of the rotary tray is supported by a plurality of sliding face blocks, it is possible to keep the contact pressure of each sliding face block with the rim to be substantially constant so that the rotary tray can be stably rotated. Due to the foregoing, the optical pickup can accurately read out information from the disk.

Further, when the rotary tray is rotated, slippage is caused only at one contact point of the rim with the sliding face block. Furthermore, the sliding face block is made of material, the slipping sound of which is very small. Therefore, compared with the conventional rotary tray, an intensity of the sound is very low, and the rotary tray supported by each sliding face block can be stably, quietly rotated over a long period of time.

According to the second aspect of the invention, height of the sliding face block to support the rotary tray is very small, that is, the sliding face block is not voluminous. Therefore, the sliding face block can not be a cause to hinder the reduction in the size of the casing. Therefore, it is possible to arbitrarily determine the positions at which the sliding face blocks are arranged and it is also possible to arbitrarily determine the number of the sliding face blocks, so that the rotary tray can be stably supported.

Further, even when the rotary tray is deformed by residual strain generated in the process of forming and errors are caused in the levelness of the lower edge of the rim, since the weight of the rotary tray is supported by a plurality of sliding face blocks, it is possible to keep the contact pressure of each sliding face block with the rim to be substantially constant so that the rotary tray can be stably rotated. Due to the foregoing, the optical pickup can accurately read out information from the disk.

Further, when the rotary tray is rotated, slippage is caused only at one contact point of the rim with the sliding face block. Furthermore, the sliding face block is made of material, the slipping sound of which is very small. Therefore, compared with the conventional rotary tray, an intensity of the sound is very low.

According to the third aspect of the invention, each sliding face block is engaged in a space formed between the recess step circumferential face on the tray support face and the support frame opposed to it, so that the sliding face block can be easily fixed at a predetermined position.

According to the fourth aspect of the invention, each sliding face block is supported by the C-shaped frame body of the support frame and the recess step circumferential face so that the sliding face block can not be moved in the horizontal direction, and at the same time each sliding face block is supported by a pair of L-shaped engaging pieces integrally protruded from both end portions of the frame body so that the each sliding face block can not rise up. Therefore, each sliding face block can be positively fixed at a predetermined position on the outer circumferential section on the tray support face.

According to the fifth aspect of the invention, each sliding face block is made of fluororesin, the frictional coefficient of which is low. Therefore, the rotary tray supported by each sliding face block can be stably, quietly rotated over a long period of time.

What is claimed is:

1. A disk changer type disk player comprising:
   a casing having a tray support face;
   a recess step circumferential face formed along an inner edge of an outer circumferential section of the tray support face;
   a plurality of support frames arranged in the outer circumferential section at regular intervals in the circumferential direction, each support frame having a substantially C-shaped frame body integrally formed in the outer circumferential section and being opposed to the recess step circumferential face and a pair of substantially L-shaped engaging pieces integrally protruding from both ends of the frame body;
   a central shaft disposed on the tray support face;
   a rotary tray having a plurality of disk mounting sections, the rotary tray being rotatably supported by the central shaft;
   a rim protruding from a lower face of the rotary tray;
   a plurality of sliding face blocks, each sliding face block is engaged in a space formed between the recess step circumferential face and the support frame; and
   an optical pickup,
   wherein a disk mounted on the disk mounting section is opposed to the optical pickup when the rotary tray is intermittently rotated by a predetermined angle,
   wherein the sliding face blocks are made of fluororesin, the frictional coefficient of which is low, and
   wherein the rim is in slidably contact with the sliding face blocks.

2. A disk changer type disk player comprising:
   a casing having a tray support face;
   a central shaft disposed on the tray support face;
   a rotary tray having a plurality of disk mounting sections, the rotary tray being rotatably supported by the central shaft;
   a rim protruding from a lower face of the rotary tray;
   a plurality of sliding face blocks arranged in an outer circumferential section of the tray support face at regular intervals in the circumferential direction; and
   an optical pickup,
   wherein the sliding face blocks are made of fluororesin, the frictional coefficient of which is low, and
   wherein the rim is in slidably contact with the sliding face blocks.

3. A disk changer type disk player according to claim 2, further comprising:
   a recess step circumferential face formed along an inner edge of the outer circumferential section; and
   a plurality of support frames integrally formed in the outer circumferential section and being opposed to the recess step circumferential face;
   wherein each sliding face block is engaged in a space formed between the recess step circumferential face and the support frame.

4. A disk changer type disk player according to claim 3, wherein the support frame includes a substantially C-shaped frame body integrally formed in the outer circumferential section, and a pair of substantially L-shaped engaging pieces integrally protruding from both ends of the frame body, and
   wherein each sliding face block is engaged in a space formed among the frame body, both the engaging pieces and the recess step circumferential face.

5. A disk changer type disk player according to claim 2, wherein each sliding face block is made of fluororesin.

6. A disk changer type disk player according to claim 2, wherein each sliding face block has a height of not less than 0.1 mm and not more than 2 mm.

* * * * *